US009134529B2

(12) United States Patent
Sonoda et al.

(10) Patent No.: US 9,134,529 B2
(45) Date of Patent: Sep. 15, 2015

(54) DISPLAY DEVICE WITH TAPERED LIGHT REFLECTING LAYER AND MANUFACTURING METHOD FOR SAME

(75) Inventors: Daisuke Sonoda, Chiba (JP); Jun Fujiyoshi, Mobara (JP); Kohei Takahashi, Chiba (JP); Takuo Kaitou, Mobara (JP); Katsumi Matsumoto, Mobara (JP)

(73) Assignee: Pixtronix, Inc., San Diego, CA (US)

( * ) Notice: Subject to any disclaimer, the term of this patent is extended or adjusted under 35 U.S.C. 154(b) by 371 days.

(21) Appl. No.: 13/553,527

(22) Filed: Jul. 19, 2012

(65) Prior Publication Data

US 2013/0021781 A1 Jan. 24, 2013

Related U.S. Application Data

(60) Provisional application No. 61/510,237, filed on Jul. 21, 2011.

(51) Int. Cl.
| | | |
|---|---|---|
| *G09F 13/04* | (2006.01) | |
| *B05D 5/06* | (2006.01) | |
| *B44C 1/22* | (2006.01) | |
| *G02B 5/22* | (2006.01) | |
| *G02B 26/02* | (2006.01) | |
| *G09G 3/34* | (2006.01) | |

(52) U.S. Cl.
CPC .............. *G02B 26/02* (2013.01); *G09G 3/3433* (2013.01); *G09G 2300/0426* (2013.01); *G09G 2300/08* (2013.01)

(58) Field of Classification Search
CPC . G02B 26/02; G09G 3/3433; G09G 2300/08; G09G 2300/0426
See application file for complete search history.

(56) References Cited

U.S. PATENT DOCUMENTS

| 7,180,651 B2 | 2/2007 | Wu et al. |
|---|---|---|
| 7,417,782 B2 | 8/2008 | Hagood et al. |
| 7,751,113 B2 | 7/2010 | Huibers |
| 7,839,356 B2 | 11/2010 | Hagood et al. |
| 7,894,114 B2 | 2/2011 | Urakawa et al. |
| 8,027,078 B2 | 9/2011 | Cho et al. |

(Continued)

FOREIGN PATENT DOCUMENTS

| CN | 1854838 A | 11/2006 |
|---|---|---|
| CN | 1894622 A | 1/2007 |
| EP | 1859311 | 11/2008 |

(Continued)

OTHER PUBLICATIONS

NPL International Preliminary Report on Patentability (Chapter II) prepared for PCT/US2012/047640 on Apr. 12, 2013.*

(Continued)

*Primary Examiner* — David N Spector
(74) *Attorney, Agent, or Firm* — Edward A. Gordon; Foley & Lardner LLP

(57) ABSTRACT

A display device includes a substrate having an upper surface. The display device also includes a light reflecting layer to reflect light, formed over the upper surface of the substrate. The display device also includes a light absorbing layer to absorb light, formed over the upper surface of the light reflecting layer. A plurality of apertures are defined through the light reflecting layer and the light absorbing layer such that, at an edge of each of the plurality of apertures, the light absorbing layer partially overhangs the light reflecting layer.

16 Claims, 8 Drawing Sheets

(56) References Cited

U.S. PATENT DOCUMENTS

| | | |
|---|---|---|
| 2008/0237611 A1 | 10/2008 | Cok et al. |
| 2011/0058243 A1 | 3/2011 | Wang |

FOREIGN PATENT DOCUMENTS

| | | |
|---|---|---|
| JP | 2008139541 A | 6/2008 |
| JP | 2008159295 A | 7/2008 |
| JP | 2010098055 A | 4/2010 |
| JP | 2011102848 A | 5/2011 |
| TW | 200952542 A | 12/2009 |
| WO | 2006091738 A1 | 8/2006 |
| WO | WO-2006091791 | 8/2006 |
| WO | 2008026348 A1 | 3/2008 |

OTHER PUBLICATIONS

Partial International Search Report—PCT/US2012/047640—ISA/EPO—Sep. 27, 2012.

International Search Report and Written Opinion—PCT/US2012/047640—ISA/EPO—Dec. 12, 2012.

Taiwan Search Report—TW101126379—TIPO—Dec. 30, 2014.

* cited by examiner

DISPLAY DEVICE WITH TAPERED LIGHT REFLECTING LAYER AND MANUFACTURING METHOD FOR SAME

CROSS-REFERENCE TO RELATED APPLICATIONS

This Patent Application claims priority to U.S. Provisional Patent Application No. 61/510,237, filed on Jul. 21, 2011, entitled "Display Device and Manufacturing Method for Same." The disclosure of the prior Application is considered part of and is incorporated by reference in its entirety in this Patent Application.

TECHNICAL FIELD

This disclosure relates to a display device, and a manufacturing method for the display device.

DESCRIPTION OF THE RELATED TECHNOLOGY

Display devices of the conventional art are designed to regulate the light intensity of a plurality of pixels formed in a display panel to display an image. Liquid crystal display devices, for example, regulate the light intensity of the pixels while changing the orientation of liquid crystal molecules. Other display devices regulate the light intensity by mechanical methods.

SUMMARY

The systems, methods and devices of the disclosure each have several innovative aspects, no single one of which is solely responsible for the desirable attributes disclosed herein.

One innovative aspect of the subject matter described in this disclosure can be implemented in a display device. The display device includes a substrate having an upper surface. The display device also includes a light reflecting layer to reflect light, formed over an upper surface of the substrate. The light reflecting layer also has an upper surface. In addition, the display device includes a light absorbing layer to absorb light, formed over the upper surface of the light reflecting layer. A plurality of apertures is defined through the light reflecting layer and the light absorbing layer such that, at an edge of each of the plurality of apertures, the light absorbing layer at least partially overhangs the light reflecting layer.

In some implementations, the transparent substrate includes at least one of a glass and a plastic. In some implementations, at the plurality of apertures, the light reflecting layer has a tapered profile. In some implementations, the substrate is a first substrate and the display device further includes a second substrate, and a space exists between the second substrate and the light absorbing layer. In some implementations, the space is filled with a fluid. In some implementations, the fluid includes at least one of a silicon oil, ethanol fluorinated silicon and a lubricant.

Another innovative aspect of the subject matter described in this disclosure can be implemented in a display device. The display device includes a first substrate defining a plurality of apertures to allow light to pass through each of a plurality of pixels, the first substrate having an upper surface and a lower surface. The display device also includes a second substrate coupled to the first substrate. The display device additionally includes a backlight for irradiating light through the lower surface of the first substrate. The first substrate in turn includes a light reflecting layer to reflect light, formed over the upper surface of the first substrate. The light reflecting layer has an upper surface. The first substrate also includes a light absorbing layer to absorb light, formed over the upper surface of the light reflecting layer. Also, at each of the plurality of apertures, the light absorbing layer at least partially overhangs the light reflective layer and a space exists between the upper surface of the second substrate and the light absorbing layer.

In some implementations, the second substrate includes a mechanical modulator formed for each pixel in a plurality of pixels. In some implementations, the light absorbing layer includes at least one of a mixture of a light absorbing material suspended in a resin, a photoresist and a black-colored material. In some implementations, at the plurality of apertures, the light reflecting layer has a tapered profile. In some implementations, the space is filled with a fluid. In some implementations, the fluid includes at least one of a silicon oil, ethanol fluorinated silicon and a lubricant.

Another innovative aspect of the subject matter described in this disclosure can be implemented in a method. The method includes forming a light reflecting layer over a transparent substrate. The light reflecting layer has an upper surface. Then, a light absorbing layer is formed over the upper surface of the light reflecting layer. Next, portions of both the light reflecting layer and the light absorbing layer are removed to define apertures such that the light absorbing layer at least partially overhangs the light reflecting layer at each of the apertures.

In some implementations, removing portions of the light reflecting layer and the light absorbing layer includes removing portions of the light reflecting layer using wet etching. In some implementations, removing portions of both the light reflecting layer and the light absorbing layer includes etching the light absorbing layer and, after etching the light absorbing layer, etching the light reflecting layer using the etched light absorbing layer as an etch mask. In some implementations, portions of the light absorbing layer are removed prior to removing portions of the light reflecting layer.

In some implementations, the transparent substrate includes at least one of a glass and a plastic. In some implementations, the light absorbing layer includes at least one of a mixture of a light absorbing material suspended in a resin, a photoresist and a black-colored material. In some implementations, at the apertures, the light reflecting layer has a tapered profile.

Details of one or more implementations of the subject matter described in this specification are set forth in the accompanying drawings and the description below. Although the examples provided in this summary are primarily described in terms of microelectromechanical system (MEMS)-based displays, the concepts provided herein may apply to other types of displays, such as liquid crystal displays (LCD), organic light emitting diodes (OLED), electrophoretic, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

DETAILED DESCRIPTION

Figure 1:
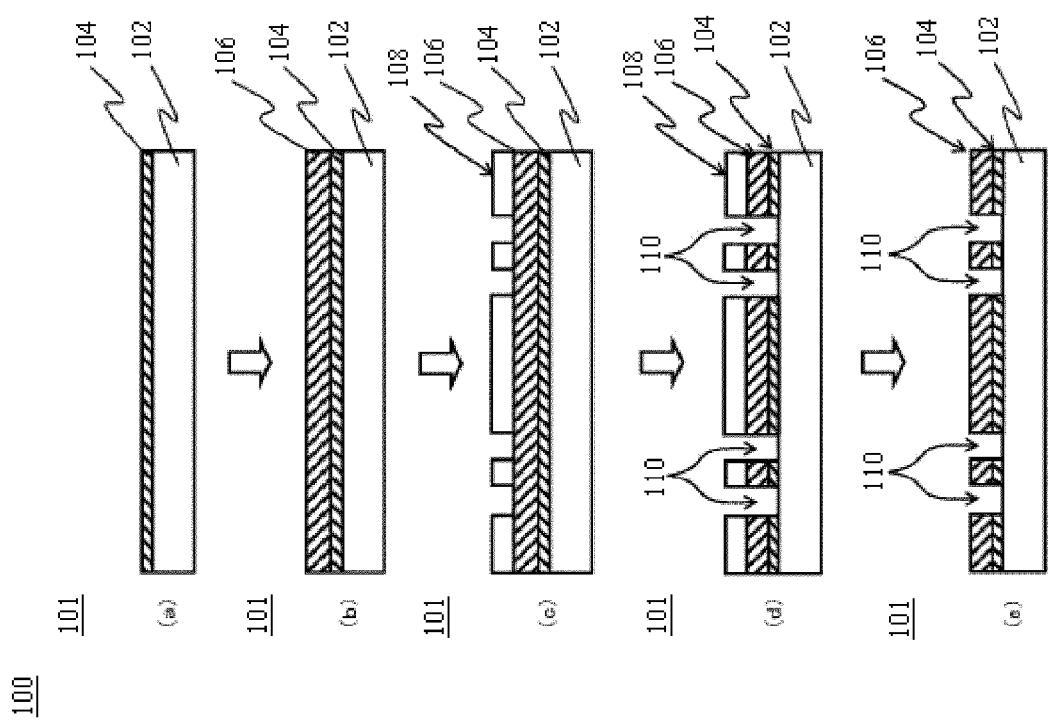
FIG. 1 shows stages of an example process to form an aperture layer structure.

This disclosure relates to displays having self-aligned apertures and methods for manufacturing such apertures. Some displays are built with aperture layers that include a light absorbing layer and a light reflecting layer. In some implementations, the light absorbing layer is disposed on top of the light reflecting layer. The aperture layers include apertures formed through each layer to allow the passage of light. Previously, when such layers were deposited and then patterned to form the aforementioned apertures, difficulties have arisen due to manufacturing tolerances and equipment variations. Namely, the apertures in the light reflecting layer may end up being smaller than the apertures of the light absorbing layer. This difference causes the light reflecting layer to be visible from the viewing area, which results in undesirable reflections that reduce the display's contrast ratio, for example. Furthermore, the processes used to manufacture displays sometimes involve many stages such as using photoresist, which result in inefficient and expensive manufacturing.

In some implementations, the methods disclosed herein for forming aperture layers mitigate the risk of apertures in a light reflecting layer being smaller than apertures of a light absorbing layer. The methods do so by having the light absorbing layer at least partially overhang the light reflecting layer. In some implementations, the light absorbing layer substantially completely covers and partially overhangs the light reflecting layer. The light reflecting layer can be etched in a tapered profile, in order to prevent the light reflecting layer from being visible from a viewing side. This reduces undesirable reflections from the viewing side and increases reflections from the back side of the reflective layer, where a light source is positioned, so that light can be reutilized if it does not pass through an aperture. Accordingly, aspects of the disclosure can be implemented as a method for forming an aperture layer structure for a display, and etching a light reflecting layer to have a tapered profile such that a light absorbing layer at least partially overhangs the light reflecting layer. This method can avoid the use of a photoresist because the light absorbing layer can be made of a photosensitive material which can be directly patterned to form apertures without a separate photoresist being applied. Thus, it acts like a photoresist layer. The resulting patterned light absorbing layer then serves as an etch mask for the underlying light reflecting layer. Accordingly, aspects of the disclosure can be implemented as an efficient method that does away with extra processing stages such as depositing and etching a photoresist as further described below.

The method includes providing a substrate, providing a light reflecting layer over the substrate, and providing a light absorbing layer over the light reflecting layer. First openings are then formed in the light absorbing layer, and second openings are formed in the light reflecting layer so as to form apertures. Wet etching is used to side-etch the light reflecting layer into a tapered profile so that the light absorbing layer partially overhangs the light reflecting layer. For wet etching, the concentration, volume, and type of chemical used can be adjusted in order to adjust the amount of side etching that occurs on the light reflecting layer.

Particular implementations of the subject matter described in this disclosure can be implemented to realize one or more of the following potential advantages. A light absorbing layer covers and at least partially overhangs a light reflecting layer to reduce undesirable reflections from a viewing side. Reducing undesirable reflections improves the contrast ratio of a display. Furthermore, the configuration of the light reflecting layer increases reflections from a back side, where a light source is positioned, so that light can be reutilized if it does not pass through an aperture. Moreover, the process for manufacturing such apertures requires fewer processing steps and thus is more efficient.

A display device includes a light-transmitting section capable of allowing the passage of light formed for each pixel of a plurality of pixels on a substrate. The display device also includes a shutter mechanism installed to control the light intensity of each pixel by allowing movement of a light blocking member that is formed to correspond to the shape of the applicable light-transmitting section.

A two-layer film lamination includes a light absorbing layer or light absorbing film formed on a viewing side and a light reflecting layer or light reflective film formed on a lighting device surface side of the display device. This laminated film is then patterned to form the light-transmitting sections also referred to as apertures. This type of laminated film allows light from the lighting device to pass through the light-transmitting sections. The light absorbing layer or the light absorbing film functions to suppress ambient or environmental light reflection, and the light reflecting layer or the reflective film functions to reflect light from the lighting device back to the light device side in order to conserve or reutilize the light.

FIG. 1 shows stages of an example process 100 to form an aperture layer structure 101. The aperture layer formation process 100 may be used to form light-transmitting sections or apertures by removing portions of a two-layer laminated film. FIG. 1(a) shows a light reflecting layer 104 being formed over a substrate 102. The light reflecting layer 104 may be made from, for example, aluminum (Al), copper (Cu) or silver (Ag). The substrate 102 may be made of a transparent, light-transmitting material such as a glass or a plastic. Next, as FIG. 1(b) shows, a light absorbing layer 106 is formed over the light reflecting layer 104. The light absorbing layer 106 may be made from, for example, chromium (Cr). In FIG. 1(c), a photoresist layer 108 is then formed over the light absorbing layer 106. Then, in FIG. 1(d), apertures 110 are formed by selectively removing portions of the two-layer laminated film that includes the light reflecting layer 104 and the light absorbing layer 106. The light reflecting layer 104 may be removed by any etching process that uses the photoresist layer 108 and/or the light absorbing layer 106 as a mask, such as through etching by immersion in wet chemicals, by a dry plasma or an ion beam etch, or any combination of the above. In FIG. 1(e), the photoresist layer 108 is then stripped away.

To simplify an aperture formation process, a manufacturing method is provided to form an aperture layer structure. In some implementations, the method includes the stages of forming a light reflecting layer over a substrate, and then forming a light absorbing layer over the light reflecting layer. Then, the light reflecting layer is patterned to form apertures. In some implementations, portions of the light reflecting layer may be removed by wet etching. In some implementations, the apertures may be formed by side etching the light reflecting layer. In some implementations, portions of the light absorbing layer are removed prior to the removing of portions of the light reflecting layer in order to form the apertures. In some implementations, the light absorbing layer are used as an etching mask for the subsequent removal of portions of the light reflecting layer. The apertures or the light-transmitting sections are sections where portions of the light absorbing layer and the light reflecting layer have been removed from the two-layer laminated film. In some implementations, the apertures are formed without using a photoresist. Instead, the apertures are formed by using the light absorbing layer as a mask to etch the light reflecting layer. The manufacturing process is thus simplified since the photoresist coating and stripping processes can be eliminated.

The manufacturing method for the display device may contain the following stages. For example, the method includes a light reflecting layer forming stage to form a light reflecting layer in order to reflect light onto a surface of the second substrate. The second substrate includes light modulators. The method also includes a light absorbing layer forming stage to form a light absorbing layer over the upper surface of the light reflecting layer. The light absorbing layer contains a mixture of light absorbing material suspended in resin. The method also includes an aperture forming stage to form apertures or light-transmitting sections by removing portions of the light reflecting layer using the light absorbing layer as a mask so that the apertures are formed without using a separate photoresist. Instead, the apertures are formed by using the light absorbing layer as a mask. Therefore, the manufacturing process for the display device is simplified since the photoresist application and removal processes are eliminated.

In some implementations, a resulting display device includes a first substrate formed with light-transmitting sections or apertures capable of allowing light to pass through each of a set of pixels and a second substrate coupled to the first substrate and including a mechanical light modulator formed for each pixel. In some implementations, there is a light reflecting layer formed over the first substrate, and a light absorbing layer formed over the light reflecting layer. In some implementations, a space exists between the second substrate and the light absorbing layer. In some implementations, the space is filled with a fluid.

In some implementations, the light absorbing layer includes a mixture of light absorbing material suspended in resin. The light absorbing material may be a black-colored material, a photo-patternable material or photoresist.

In some implementations, the light reflecting layer may be side-etched to a degree such that the light absorbing layer creates an overlay over the light reflecting layer at the apertures. In some implementations, the light reflecting layer may include a multilayer stack of thin films.

Figure 2:
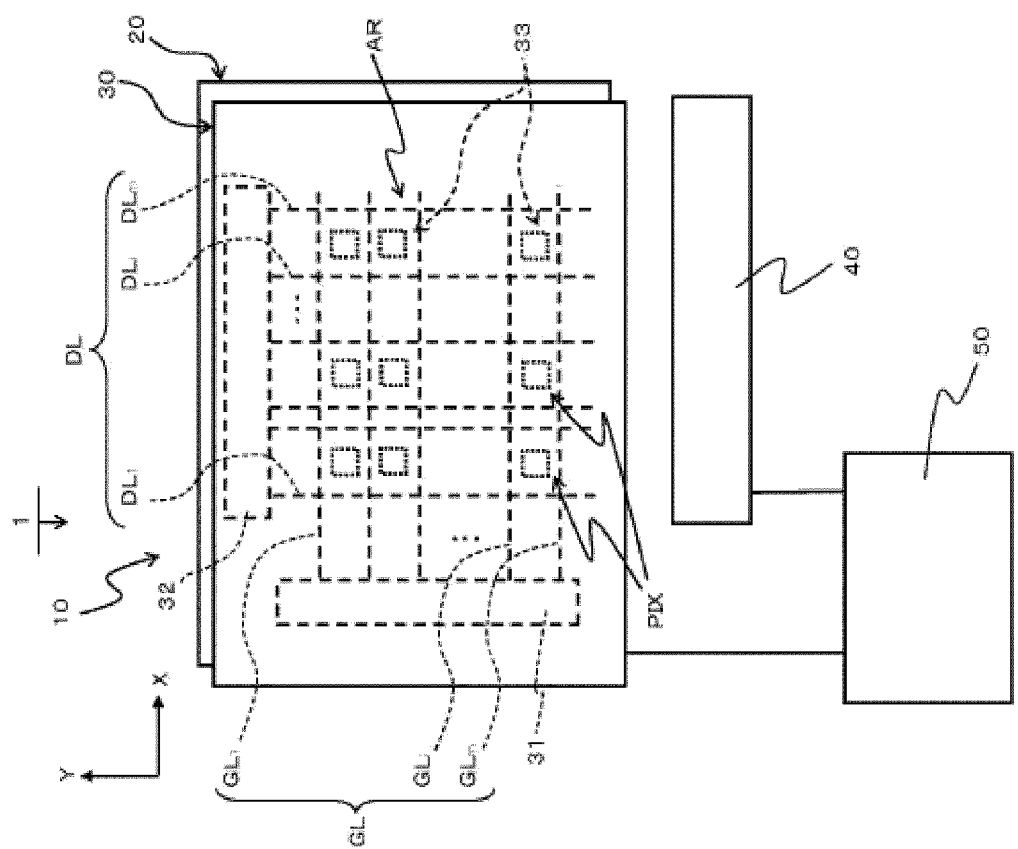
FIG. 2 shows an example schematic diagram of a display device.

FIG. 2 shows an example schematic diagram of a display device 1. The display device 1 includes a display panel 10, a lighting device 40 and a control unit 50. The display panel 10 includes a first substrate 20, a second substrate 30 containing a shutter mechanism 33, and a working fluid that is sandwiched between the first substrate 20 and the second substrate 30.

The first substrate 20 is a substrate formed over the rear side of display panel 10. The first substrate 20 also contains an irradiated surface for light from the lighting device 40. The second substrate 30 is a substrate formed over the display screen side of the display panel 10. This second substrate 30 also includes a set of scanning lines GL ($GL_1, \ldots, GL_j, \ldots,$ $GL_m$; j and m are integers) and a set of data lines DL ($DL_1, \ldots, DL_i, \ldots, DL_n$; i and n are integers). The second substrate also includes a scanning driver 31, a data driver 32, and a set of shutter mechanism units 33. Each of the scanning lines GL extends along the X or horizontal direction in FIG. 2 in the display region AR over the second substrate 30. The scanning lines GL are arrayed in parallel in the Y or vertical direction. Each of the data lines DL extends in the Y direction in FIG. 2 while insulated from the scanning lines GL. Each region enclosed by these GL and DL lines respectively forms a pixel PIX.

The scanning driver 31 supplies sequential scanning signals from, for example, top to bottom in FIG. 2 to each scanning line GL. One end of each scanning line GL extends to couple to the scanning driver 31. The data driver 32 supplies video signals to each DL line in synchronization with the timing in which the scanning signals are supplied.

Figure 3:
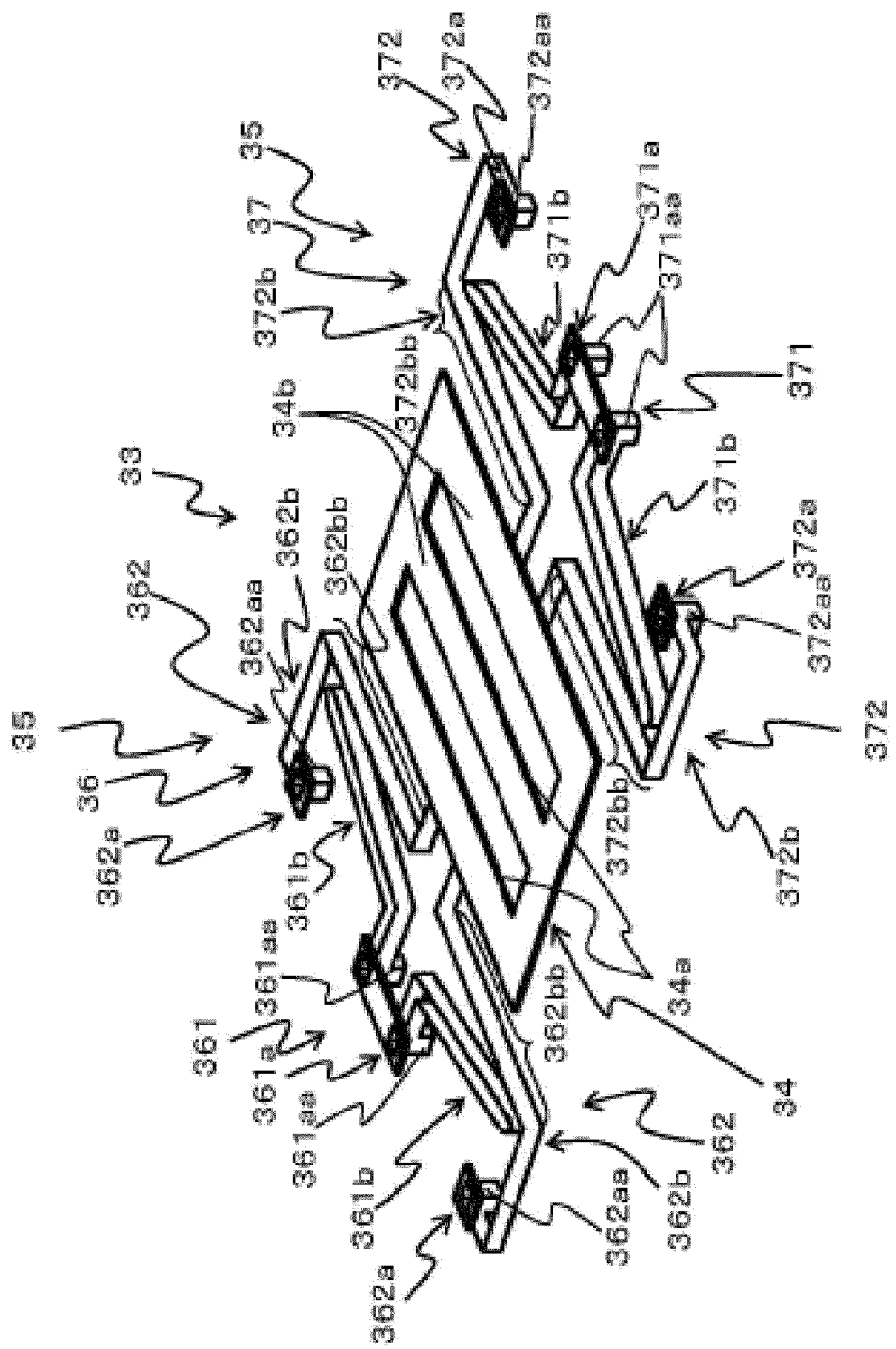
FIG. 3 shows an example perspective view of a shutter mechanism.

The shutter mechanism 33 varies the light intensity of each pixel PIX by shifting the shutter unit 34, as shown in FIG. 3. More specifically, the shutter mechanism 33 is formed over the surface of the second substrate 30 on the working fluid side. The shutter mechanism 33 blocks or allows the passage of light from the lighting device 40 to the display side of each pixel PIX.

Figure 5:
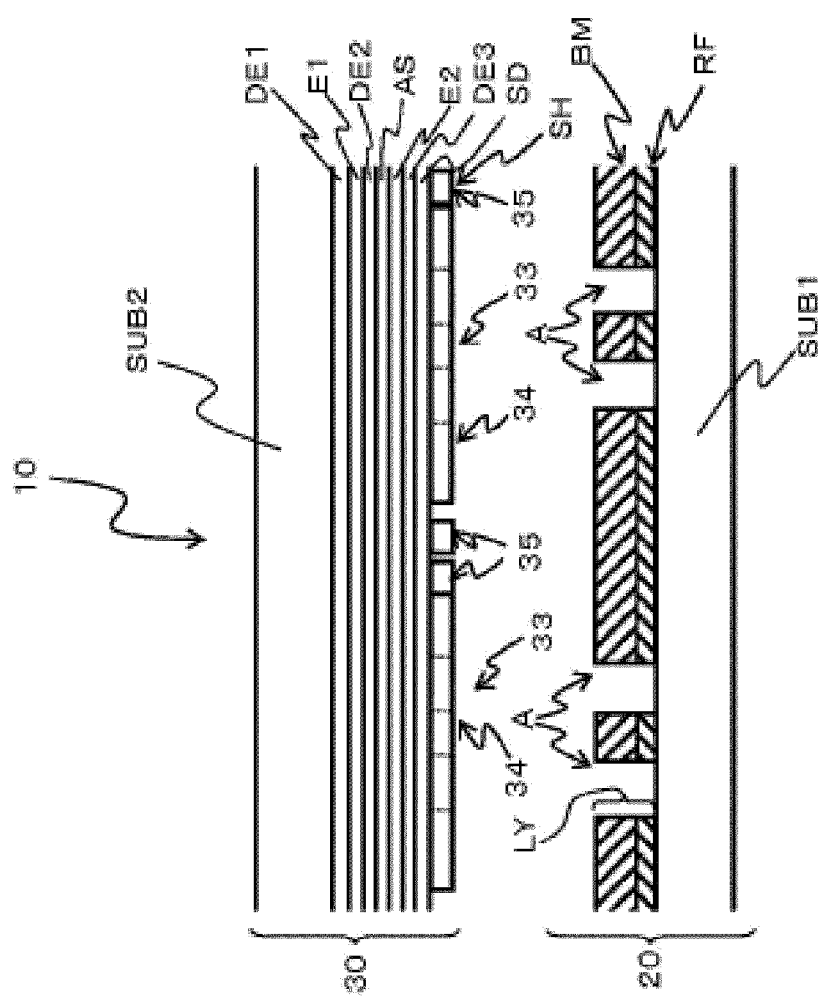
FIG. 5 shows an example cross sectional view of a display panel.
Figure 6:
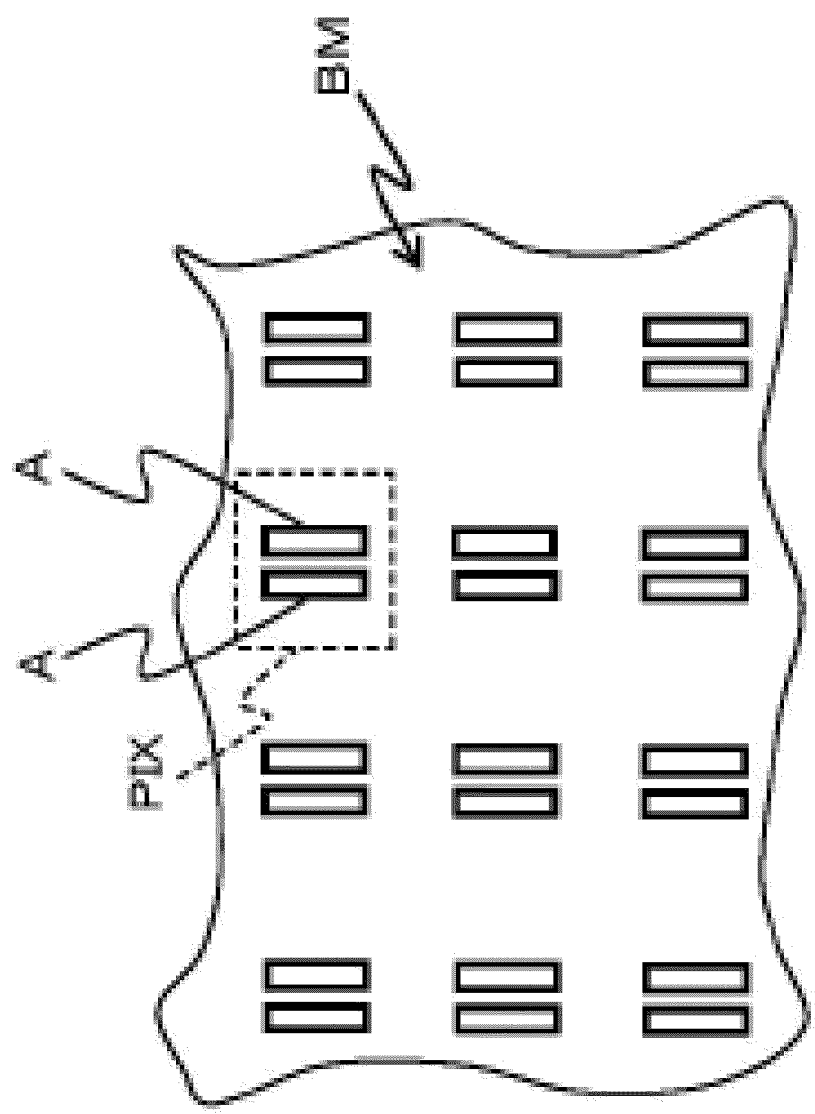
FIG. 6 shows an example plan view of a display surface of a display device.

The shutter mechanism 33 contains a shutter unit 34 and an actuator unit 35 as shown in FIG. 3. The shutter unit 34 is a rectangular plate that functions as a light blocking member. The shutter unit 34 has a shape corresponding to the shape of the light-transmitting section A as shown in FIGS. 5 and 6 and light-transmitting section or aperture 708 in FIG. 7. In other words, the two slots 34a and the light blocking units 34b are formed to allow the transmission or the blocking of light passing through the light-transmitting section A or 708.

FIG. 3 shows an example perspective view of the shutter mechanism 33. The shutter mechanism 33 was discussed above for FIG. 2. In the shutter mechanism 33, an actuator unit 35 includes an opening actuator 36 and a closing actuator 37. The opening actuator 36 is driven by the actuator unit 35 so as to open the shutter unit 34. In other words, the shutter unit 34 allows light from the light device 40 to pass through. More specifically, the opening actuator 36 moves the shutter unit 34 to a position where the two slots 34a formed in the shutter unit 34 face the light-transmitting section A or 708. This opening actuator 36 contains a first electrode unit 361 and a second electrode unit 362.

The first electrode unit 361 contains a first voltage applicator 361a and a pair of first moving units 361b. The first voltage applicator 361a in turn contains a pair of support rods 361aa, to which voltage is applied. One end of each first moving unit 361b is a fixed end linking to the upper parts of the support rods 361aa of the first voltage applicator 361a. The other end of each moving unit 361b is a free end. Each of the first moving units 361b is formed close to the straight section 362bb of the second electrode unit 362.

The second electrode unit 362 contains a pair of second voltage applicators 362a and a pair of second moving units 362b. The pair of second voltage applicators 362a in turn contains a pair of support rods 362baa, to which voltage is applied. One end of each second moving unit 362b is linked to the upper parts of the support rods 362aa of the second voltage applicator 362a, and the other end links to the shutter unit 34. These second moving units 362b contain a straight section 362bb formed in parallel with the shorter side of the shutter unit 34. By applying a voltage so that the voltage differential between the first voltage applicator 361a and the second voltage applicator 362a is larger than a specified voltage, the pair of first moving units 361b and the pair of second moving units 362b draw together from the free side of the first moving units 361b located at the nearest distance. This causes the shutter unit 34 to be moved to the opening actuator 36 side. The shifting of the shutter unit 34 in this way moves and places it in a position where the slots 34a face the light-transmitting section A or 708.

On the other hand, the closing actuator 37 is driven so as to shut the shutter unit 34. In other words, the shutter unit 34 blocks the light from the lighting device 40. More specifically, the shutter unit 34 is moved so that the light blocking unit 34b is moved to a position facing the light-transmitting section A. The closing actuator 37 also contains a first electrode unit 371 and a second electrode unit 372.

The first electrode unit 371 contains a first voltage applicator 371a and a pair of first moving units 371b. The first voltage applicator 371a contains a pair of support rods 371aa, to which the voltage is applied. One end of each first moving unit 371b is a fixed end linking to the upper parts of the support rods 371aa of the first voltage applicator 371a, and the other end is free. Each of the first moving units 371b is formed close to the straight section 372bb of the second electrode 372.

The second electrode unit 372 contains a pair of second voltage applicators 372a and a pair of second moving units 372b. The pair of second voltage applicators 372a in turn contains a pair of support rods 372aa, to which the voltage is applied. One end of each second moving unit 372b is linked to the upper parts of the support rods 372aa of the second voltage applicator 372a, and the other end links to the shutter unit 34. These second moving units 372b contain a straight section 372bb formed in parallel with the shorter side of the shutter unit 34. By applying a voltage so that the voltage differential between the first voltage applicator 371 a and the second voltage applicator 372a is larger than a specified voltage, the pair of first moving units 371b and the pair of second moving units 372b draw together from the free side of the first moving units 371b located at the nearest distance. This causes the shutter unit 34 to move to the closing actuator 37 side. The shifting of the shutter unit 34 in this way moves the light blocking unit 34b to a position facing the light-transmitting section A or 708.

The shutter mechanism unit 33 in this way moves the shutter unit 34 to regulate the light intensity of each of the pixels PIX shown in FIG. 2.

Referring back to FIG. 2, the lighting device 40 includes light emitting diodes, for example. The lighting device 40 is mounted on the rear side of the display panel 10, and irradiates light towards the display panel 10. In some implementations, the control unit 50 includes a central processing unit (CPU), for example. The control unit 50 is electrically coupled to each component of the above described display device 1, and controls the operation of the entire display device 1. The control unit 50 may also contain a memory for temporarily holding video data that was input from external systems.

Figure 4:
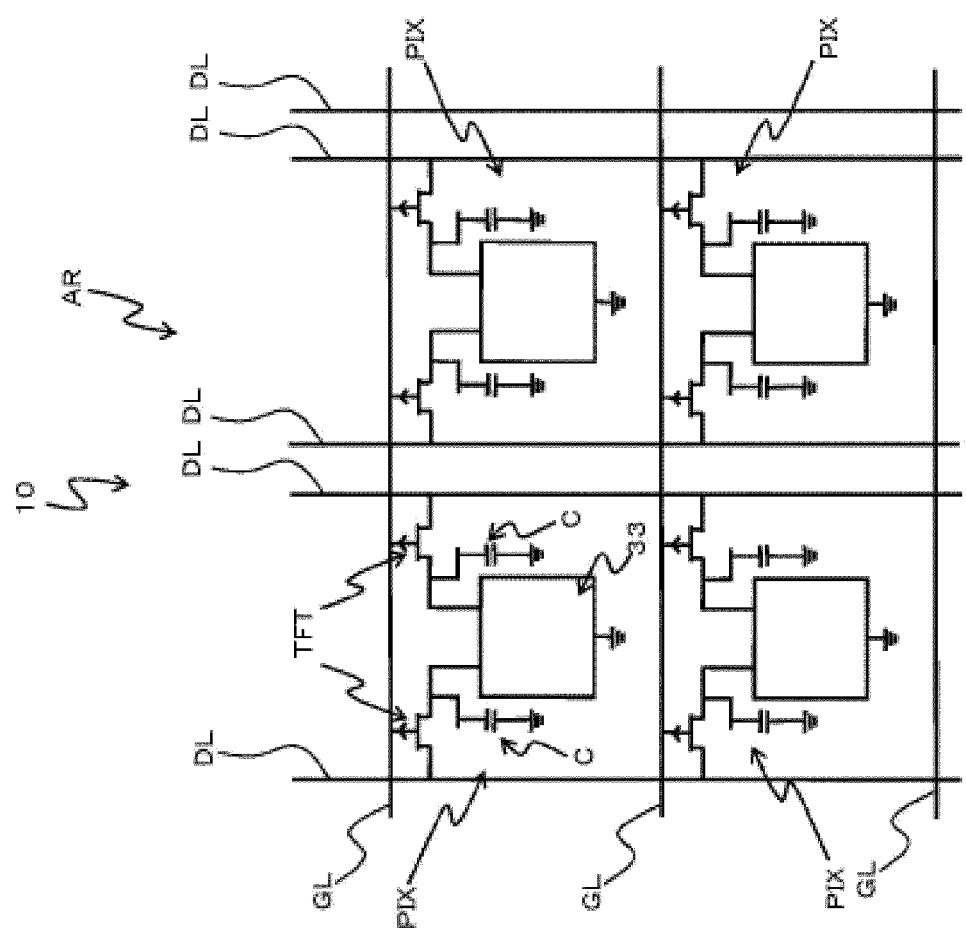
FIG. 4 shows an example schematic diagram of a display region.

FIG. 4 shows an example schematic diagram of a display region AR. The structure of the pixels PIX of the display panel 10 is illustrated in FIG. 4, which also shows the circuit equivalent to the display region AR of the display panel 10 as shown in FIG. 2. Each pixel PIX contains one scanning line GL, and two data lines DL for addressing each pixel PIX in a row of pixels. One of the two data lines DL is a data line DL for sending signals to drive the shutter unit 34 to the open position. The other data line DL is for sending a signal to drive the shutter unit 34 to the closed position.

Each pixel PIX contains two thin-film transistors TFT and two capacitors C. The gates on the two thin-film transistors TFT are electrically coupled to the scanning line GL. Moreover, the source on one of the two thin-film transistors TFT is electrically coupled to the data line DL that sends the signal to open the shutter unit 34. The drain on this thin-film transistor electrically couples in parallel to one of the electrodes on one capacitor C within the pixel PIX, and to one of the voltage applicators for the opening actuator 36. The other electrode on this capacitor C is electrically coupled to ground.

The source on the other thin-film transistor TFT within the pixel PIX electrically couples to the data line DL that sends signals to drive the shutter unit 34 to the closed state. The drain of this thin-film transistor TFT electrically couples in parallel to one of the electrodes on one capacitor C within the pixel PIX, and to one of the other voltage applicators for the closing actuator 37. The other electrode on this capacitor C is electrically coupled to ground.

FIG. 5 shows an example cross sectional view of the display panel 10. The second substrate 30 is described first. This description refers to the surface of the second substrate 30 that faces the first substrate 20 as "the upper side." In other words, even though the second substrate 30 is shown as upside-down in FIG. 5, the lowermost surface of the lowermost layer of the second substrate 30 is still referred to as "the upper side" or "the upper surface." The second substrate 30 contains a dielectric layer DE1 deposited over an upper surface of a transparent substrate SUB2. In some implementations, the dielectric layer DE1 may be deposited over the light transmittance substrate SUB2 by, for example, chemical vapor deposition (CVD) or physical vapor deposition (PVD). In some implementations, the light transmittance substrate SUB2 may be made of a glass or a plastic. In some implementations, the dielectric layer DE1 may be made up of a material such as, for example, silicon dioxide ($SiO_2$) or silicon nitride ($Si_3N_4$).

A first conductive layer E1 is deposited on the upper surface of this dielectric layer DE1. Then, multiple scanning lines GL are also patterned. A portion of the scanning lines GL within each pixel PIX forms the gates of the thin-film transistor TFT. An dielectric layer DE2 is deposited over the upper surface of this first conductive layer E1. In some implementations, the dielectric layer DE2 may be made of a material such as $SiO_2$ or $Si_3N_4$.

A semiconductor layer AS is deposited over the upper surface of the dielectric layer DE2. The source, drain, and channel regions of the thin-film transistor TFT are then formed by patterning the semiconductor layer AS. A second conductive layer E2 is deposited over the upper surface of the semiconductor layer AS. Multiple data lines DL are then formed by patterning the second conductive layer E2. Portions of this second conductive layer E2 are formed as contact points for the source and drain regions of the thin-film transistor TFT. The capacitor C includes a flat plate formed by the first conductive layer E1 and the second conductive layer E2, and a semiconductor element enclosed between these layers E1 and E2.

A dielectric layer DE3 is then deposited over the upper surface of the second conductive layer E2. A sacrificial mechanical layer or passivation dielectric SD is then deposited over the upper surface of this dielectric layer DE3. Conductive through-holes (not shown in FIG. 5) are then formed in the dielectric layer DE3 and also in the sacrificial mechanical layer SD so that the actuator unit 35 is electrically coupled to the second conductive layer E2.

A shutter mechanism forming layer SH is then deposited over the upper surface of the sacrificial mechanical layer SD, where the shutter unit 34 and actuator unit 35 are formed. The shutter mechanism unit 33 is formed in this way and is also fixed to the second substrate 30 by way of the electrically conductive through-holes (not shown in FIG. 5). The sacrificial mechanical layer SD is removed in order to form a gap between the shutter unit 34 and the inductive layer DE3. The shutter unit 34 is then supported to allow movement via the actuator unit 35.

The first substrate 20 is described next. For purposes of simplicity, the surface of the first substrate 20 that faces the second substrate 30 is referred to here as "the upper surface." In other words, because the first substrate 20 is oriented upright in FIG. 5, the topmost surface of the topmost layer of the first substrate 20 is considered to be "the upper side" or "upper surface." On the first substrate 20, a reflective film RF is deposited on the upper surface of a transparent substrate SUB1, which may be made of a glass or a plastic, for example. The reflective film RF includes a material such as Ag, Al or Cu for reflecting light. A light absorbing resin film BM containing a resin mixed with a light absorbing material is then deposited over the upper surface of the reflective film RF. This light absorbing resin film BM may utilize a light absorbing material such as carbon-black or titanium-black. Moreover, acrylic resin may be utilized as the resin mixed with this light absorbing material.

A light-transmitting section A is formed at a position corresponding to each pixel PIX of the two-layer laminated film LY including the reflective film RF and the light absorbing resin film BM. The light-transmitting section A is the section where portions of the two-layer laminated film LY were removed. These light-transmitting sections A may be formed in rectangular shapes, and two of the light-transmitting sections A may be provided in parallel for each pixel PIX.

A working fluid is injected between the first substrate 20 and the second substrate 30 of the above structure by way of a seal unit. The seal unit may include a composite resin such as an epoxy resin. In some implementations, the working fluid possesses a certain dielectric constant for lowering the drive voltage of the shutter mechanism 33 and a certain viscosity for functioning as a lubricant. The working fluid may be, for example, silicon oil, ethanol, fluorinated silicon, or hydrofluoroether (HFE).

FIG. 6 shows an example plan view of a display surface of a display device. Specifically, FIG. 6 is a plan view of the first substrate 20 as seen from the side of the display surface of the display device 1. As depicted in FIG. 6, the light-transmitting sections A are formed in the light absorbing resin film BM. Furthermore, as depicted in FIG. 6, light-transmitting sections A may be formed in rectangular shapes, and two of the light-transmitting sections A may be provided in parallel for each pixel PIX.

Figure 7:
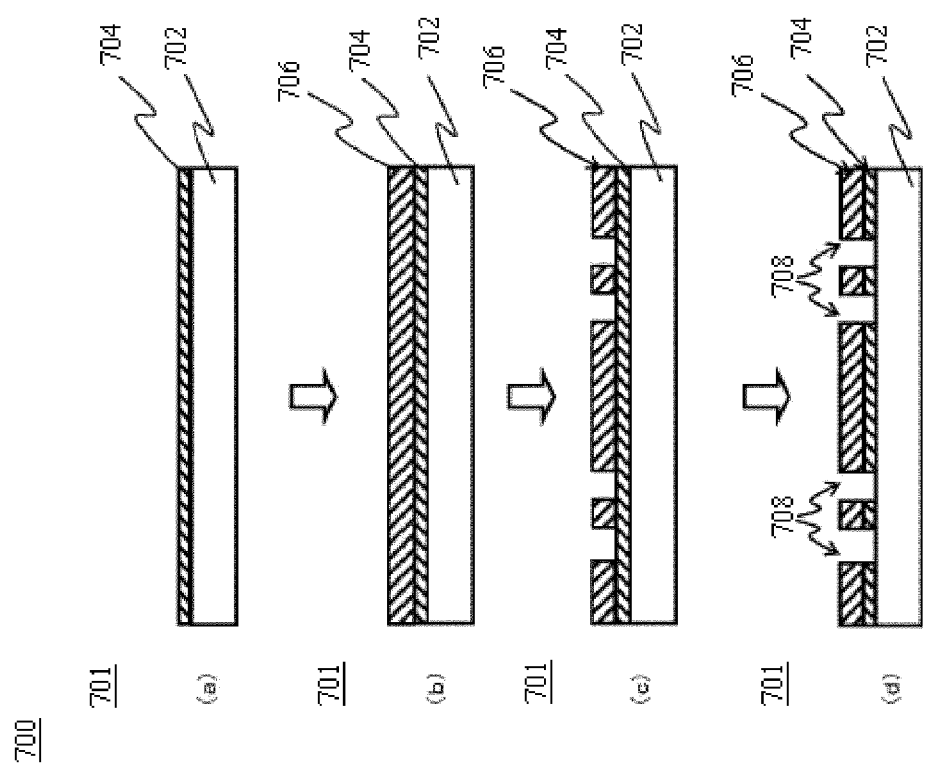
FIG. 7 shows stages of an example process to form an aperture layer structure.

FIG. 7 shows stages of an example process to form an aperture layer structure 701. Specifically, FIG. 7 shows the method of manufacturing the aperture layer structure 701, which is similar to the first substrate 20 of FIGS. 2 and 5. As shown in FIG. 7(a), a light reflecting layer 704 is deposited over an upper surface of a substrate 702.

As shown in FIG. 7(b), a light absorbing layer 706 is then deposited over the light reflecting layer 704. In some implementations, the light absorbing layer 706 may be made of a photosensitive material suspended in a resin, a photoresist, a photo-patternable material or a black-colored material. In some implementations, the light absorbing layer 706 may be deposited onto the light reflecting layer 704 by CVD or PVD.

As shown in FIG. 7(c), the light absorbing layer 706 is then patterned by photolithography using ultraviolet (UV) light and a mask. A set of openings is formed into the light absorbing layer 706. In some implementations, a standard photolithography and exposure process may be used to form the set of openings into light absorbing layer 706. In some implementations, the set of openings will be used to form a set of light-transmitting sections or apertures 708.

As shown in FIG. 7(d), the light reflecting layer 704 is patterned to form the light-transmitting sections or apertures 708. Specifically, the light reflecting layer 704 is patterned by using the light absorbing layer 706 as a mask in order to form the light-transmitting sections or apertures 708. The portions of the light reflecting layer 704 that are uncovered by the set of openings in the light absorbing layer 706 are removed in order to form the light-transmitting sections or apertures 708. In some implementations, etching may be used to remove the portions of the light reflecting layer 704 uncovered by the set of openings in the light absorbing layer 706. In some implementations, etching processes such as wet etching by immersion in wet chemicals, a dry plasma or ion beam etch, or any combination of the above may be used to etch the light reflecting layer 704. In some implementations, wet etching specifically is implemented when patterning the light reflecting layer 704. The degree to which the light reflecting layer 704 is patterned is controlled by the type of chemical fluid used, its volume and/or its concentration. In some implementations, side etching is implemented to control the degree to which the light reflecting layer 704 may be etched. In some implementations, portions of the light absorbing layer 706 are removed from the substrate 702 prior to removing portions of the light reflecting layer 704.

Figure 8:
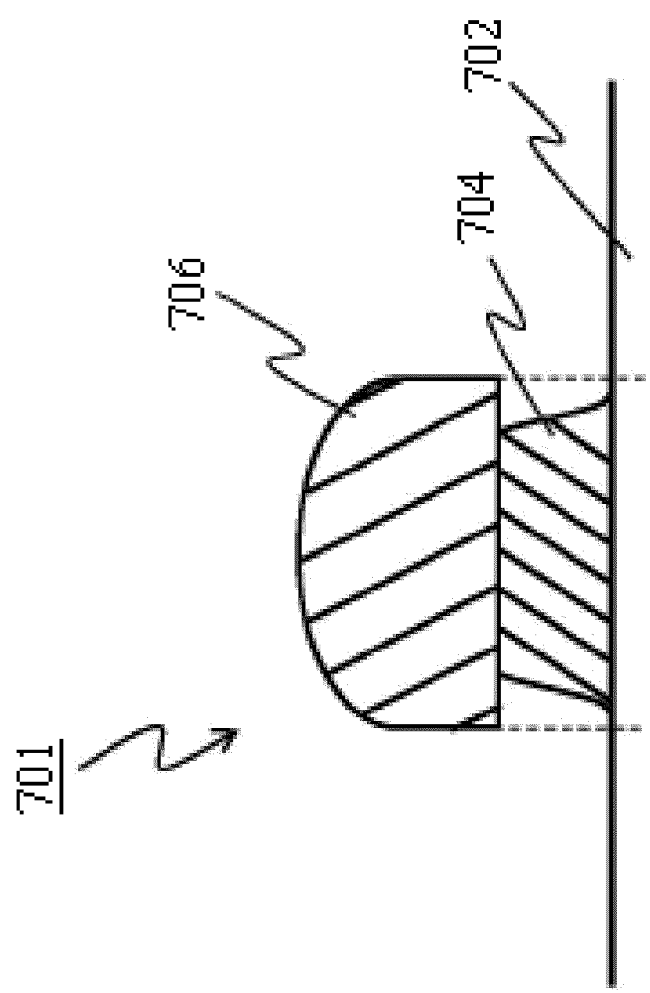
FIG. 8 shows an example aperture layer structure.

FIG. 8 shows an example aperture layer structure. Specifically, FIG. 8 is an enlarged view of a section of the aperture layer structure 701 as shown in FIG. 7.

In some implementations, when patterning the light reflecting layer 704, the amount of side etching may be adjusted so that the light reflecting layer 704 is hidden below and completely covered by the light absorbing layer 706. Therefore, when the display device 1 side is seen by the user, substantially none of the light reflecting layer 704 is visible, and hence undesired light reflections do not occur. Moreover, this configuration increases the exposure of the light reflecting layer 704 as seen from the lighting device 40 side. Patterning the light reflecting layer 704 in this way suppresses undesirable reflection of light from the light reflecting layer 704 from the viewing side, as the light absorbing layer 706 at least partially overhangs the light reflecting layer 704. Likewise, the light reflecting layer 704 reflects as much light as possible from the side of the lighting device 40 so that light can be reutilized and conserved.

In some implementations, a space exists between a bottom surface of the light absorbing layer 706 and a top surface of the substrate 702 caused by the tapered profile of a light reflecting layer 704.

In some implementations, wet etching may be utilized to pattern the light reflecting layer 704. The degree to which the light reflecting layer 704 is side etched can be adjusted by varying a range of parameters. Such parameters can include the type of etching fluid employed, its composition, its volume and/or its fluid concentration. Furthermore, the amount of side etching resulting from this approach can be more readily adjusted in comparison to dry etching, for instance. The light absorbing layer 706 can also be utilized as a mask so that the side etching amount can be primarily or solely applied to the light reflecting layer 704.

In the display device 1 shown in FIGS. 5, 7 and 8, the reflective film RF or the light reflecting layer 704 may be formed on the first substrate 20 or substrate 702. The reflective film RF reflects light onto the upper surface of the second substrate 30. A light absorbing resin film BM or light absorbing layer 706 may be formed over the upper surface of the reflective film RF or light reflecting layer 704. In some implementations, the light absorbing resin film BM may include light absorbing material mixed in or suspended in a resin, for example. The light-transmitting section A or aperture 708 is the section where portions of the two-layer laminated film LY including the light reflective film RF (or light reflecting layer 704) and the light absorbing resin film BM (or light absorbing layer 706) are removed. Therefore, light-transmitting sections A or 708 can be formed utilizing the light absorbing resin film BM (or the light absorbing layer 706) as a mask without having to use a photoresist layer. The manufacturing process is therefore simplified and streamlined since the photoresist coating and the stripping processes are eliminated.

Moreover, in the display device 1 of this disclosure, the reflective film RF (or the light reflecting layer 704) for forming the light-transmitting section A or 708 can be made by side etching. This suppresses the reflection of light from the reflective film RF (or the light reflecting layer 704) as seen from the side of the display device 1. Furthermore, the reflective film RF (or the light reflecting layer 704) reflects as much light as possible so that the light can be reutilized and conserved by the lighting device 40.

Furthermore, the manufacturing method for the display device 1 may include forming a reflective film RF to reflect light onto the upper surface of the second substrate 30 side of the first substrate 20. Then, a light absorbing resin film BM is formed as a mixture of light absorbing material in resin, onto the upper surface of the reflective film. Afterwards, light-transmitting sections A are formed by removing portions of the reflective film RF by using the light absorbing resin film layer as a mask. Therefore, the light-transmitting section A can be formed by utilizing the light absorbing resin film BM as a mask without having to utilize any photoresist layers. The manufacturing process therefore can be effectively simplified since the photoresist application and removal process are eliminated.

In some implementations, the reflective film RF is patterned by wet etching so that a side etching process can be performed to yield an undercut. Consequently, the reflection of light from the reflective film RF as seen from the viewing side can be suppressed. Moreover, the reflective film RF reflects as much light as possible so that light can be reutilized and conserved by the lighting device 40. In some implementations, the space between the upper surface of the second substrate and the light absorbing resin film BM is filled with a fluid. The fluid may include silicon oil, ethanol, or fluorinated silicon.

In the example disclosed for the display device 1, the light-transmitting sections A may be a rectangular shape, and may be formed in parallel with each pixel PIX. However, the present disclosure is not limited to this example. Any shape and any number of light-transmitting sections A are permissible with the two-layer laminated film LY including the light reflective film RF and the light absorbing resin film BM, and portions of both layers are removed to form a section at each pixel PIX to allow light to pass. The light-transmitting section A may, for example, be a square shape.

The example manufacturing method for the display device 1 described the use of wet etching when patterning the light reflective film RF to form the light-transmitting section A. However, the present disclosure is not limited to this example. In other words, dry etching or ion-based plasma etching may also be utilized when patterning the light reflective film RF to form the light-transmitting section.

The display device and manufacturing methods disclosed herein utilize the above implementations; however, the present disclosure is not limited by the above description, and all manner of adaptations and variations not departing from the scope and spirit of the present disclosure are permitted.

Various additional structures may be incorporated with aperture layer structures, such as those described herein. In some implementations, structures are incorporated over portions or all of the aperture layer and/or over portions or all of the apertures. In some implementations, after the aperture layer has been patterned into apertures, a plurality of spacers may be formed on the aperture layer.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. a general purpose processor may be a microprocessor, or, any conventional processor, controller, microcontroller, or state machine. a processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display device comprising:
a substrate having an upper surface;
a light reflecting layer to reflect light, formed over the upper surface of the substrate, the light reflecting layer having an upper surface; and
a light absorbing layer to absorb light, formed over the upper surface of the light reflecting layer,
wherein a plurality of apertures are defined through the light reflecting layer and the light absorbing layer such that, at an edge of each of the plurality of apertures, the light absorbing layer at least partially overhangs the light reflecting layer, and
wherein, at the plurality of apertures, the light reflecting layer has a tapered profile, and in which the tapered profile of the reflective layer narrows towards the substrate in a direction towards the middle of the aperture.

2. The display device of claim 1, wherein the substrate includes at least one of a glass and a plastic.

3. The display device of claim 1, wherein the substrate is a first substrate and further comprising a second substrate disposed over the first substrate, and further wherein a space exists between the second substrate and the light absorbing layer.

4. The display device of claim 3, wherein the space is filled with a fluid.

5. The display device of claim 4, wherein the fluid includes at least one of a silicon oil, ethanol fluorinated silicon and a lubricant.

6. A display device comprising:
a first substrate defining a plurality of apertures to allow light to pass through each of the plurality of apertures, the first substrate having an upper surface and a lower surface;
a second substrate coupled to the first substrate; and
a backlight for irradiating light through the lower surface of the first substrate, wherein the first substrate includes:
a light reflecting layer to reflect light, formed over the upper surface of the first substrate, the light reflecting layer having an upper surface; wherein, at each of the plurality of apertures, the light reflecting layer has a tapered profile, and in which the tapered profile of the reflective layer narrows towards the substrate in a direction towards the middle of the aperture; and
a light absorbing layer to absorb light, formed over the upper surface of the light reflecting layer, and further wherein, at each of the plurality of apertures, the light absorbing layer at least partially overhangs the light reflecting layer and a space exists between the second substrate and the light absorbing layer.

7. The display device of claim 6, wherein the second substrate includes a mechanical modulator formed for each pixel in a plurality of pixels.

8. The display device of claim 6, wherein the light absorbing layer includes at least one of a mixture of a light absorbing material suspended in a resin, a photoresist and a black-colored material.

9. The display device of claim 6, wherein the space is filled with a fluid.

10. The display device of claim 9, wherein the fluid includes at least one of a silicon oil, ethanol fluorinated silicon and a lubricant.

11. A method comprising:
forming a light reflecting layer over a transparent substrate, the light reflecting layer having an upper surface;
forming a light absorbing layer over the upper surface of the light reflecting layer; and
removing portions of the light reflecting layer and the light absorbing layer to define apertures such that the light absorbing layer at least partially overhangs the light reflecting layer at each of the apertures, and such that at each of the apertures the light reflecting layer has a tapered profile, and in which the tapered profile of the reflective layer narrows towards the substrate in a direction towards the middle of the aperture.

12. The method of claim 11, wherein removing portions of the light reflecting layer and the light absorbing layer includes removing portions of the light reflecting layer using wet etching.

13. The method of claim 11, wherein removing portions of the light reflecting layer and the light absorbing layer includes etching the light absorbing layer and, after etching the light absorbing layer, etching the light reflecting layer using the etched light absorbing layer as an etch mask.

14. The method of claim 11, wherein portions of the light absorbing layer are removed prior to removing portions of the light reflecting layer.

15. The method of claim 11, wherein the transparent substrate includes at least one of a glass and a plastic.

16. The method of claim 11, wherein the light absorbing layer includes at least one of a mixture of a light absorbing material suspended in a resin, a photoresist and a black-colored material.

* * * * *